United States Patent
Hara et al.

(10) Patent No.: US 7,354,676 B2
(45) Date of Patent: Apr. 8, 2008

(54) CELL BODY FOR FUEL CELL AND METHOD OF MANUFACTURING THE SAME

(75) Inventors: Naoki Hara, Yokohama (JP); Itaru Shibata, Kamakura (JP); Makoto Uchiyama, Miura (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 485 days.

(21) Appl. No.: 10/407,267

(22) Filed: Apr. 7, 2003

(65) Prior Publication Data

US 2003/0207166 A1    Nov. 6, 2003

(30) Foreign Application Priority Data

May 1, 2002    (JP)    ............................ P2002-129924

(51) Int. Cl.
*H01M 4/86* (2006.01)
*H01M 8/10* (2006.01)

(52) U.S. Cl. ............................ 429/44; 429/40; 429/30

(58) Field of Classification Search .................. 429/39, 429/44

See application file for complete search history.

(56) References Cited

U.S. PATENT DOCUMENTS

| 3,525,646 | A * | 8/1970 | Tannenberger et al. ........ 429/31 |
| 6,638,654 | B2 * | 10/2003 | Jankowksi et al. ........... 429/26 |
| 6,783,880 | B2 * | 8/2004 | Christiansen ................ 429/33 |

FOREIGN PATENT DOCUMENTS

| JP | 6-29024 | 2/1994 |
| JP | 6-88199 | 3/1994 |

OTHER PUBLICATIONS

"Performance of Anode Supported Planar SOFC Cells", D. Ghosh et al., Electrochemical Society Proceeding vol. 99-19, pp. 822-829.
"Recent Progress in Tubular Solid Oxide Fuel Cell Technology", S. C. Singhai, Electrochemical Proceedings vol. 97-18, pp. 36-51.
Japanese Office Action issued in corresponding Japanese Patent Application No. JP 2002-129924, dated Aug. 14, 2006.

* cited by examiner

*Primary Examiner*—Susy Tsang-Foster
*Assistant Examiner*—Ben Lewis
(74) *Attorney, Agent, or Firm*—McDermott Will & Emery LLP

(57) ABSTRACT

A cell body for a fuel cell comprises a metal support and an electrolyte layer and an air electrode layer. The electrolyte layer and the air electrode layer are formed on the metal support. A concave portion is formed in an arbitrary pattern on the metal support, and the bottom of the concave portion is made to be porous.

15 Claims, 7 Drawing Sheets

CELL BODY FOR FUEL CELL AND METHOD OF MANUFACTURING THE SAME

BACKGROUND OF THE INVENTION

1. Field of the Invention

The present invention relates to a thin-film solid oxide fuel cell using a metal support. More specifically, the present invention relates to a cell body for a fuel cell, which is capable of constituting a cell element (a single cell) and a gas flow path at any arbitrary position on the metal support, and capable of obtaining a fuel cell that is excellent in output density per volume at low cost. Moreover, the present invention relates to a method of manufacturing the cell body and to a solid oxide fuel cell stack using such a cell body.

2. Description of the Related Art

In recent years, fuel cells have gained attention as a clean energy source, which is highly efficient in electric power generation, generates little poisonous exhaust gas, and is friendly to the environment.

From among a variety of fuel cells, a solid oxide fuel cell (hereinafter, referred to as "SOFC") uses, as an electrolyte, an oxide ion conductive solid electrolyte such as yttria-stabilized zirconia (hereinafter, referred to as "YSZ"). The SOFC is a fuel cell in which electrodes with permeated gases are provided on both surfaces, and fuel gas such as hydrogen and hydrocarbon is supplied to one electrode and oxygen gas or air is supplied to the other electrode with the solid electrolyte taken as a partition wall, thus generating electric power.

The operation temperature of the conventional SOFC is as high as approximately 1,000° C. because ion conductivity of a solid electrolyte layer thereof is insufficient if the temperature of the solid electrolyte layer is not high. Therefore, the conventional SOFC has had problems in safety, reliability in the operation thereof, and the high cost of high temperature resistant materials, and the like.

Accordingly, realization of the SOFC operation at a lower temperature has been taken up as an important subject. Progress has been made in the development of a solid electrolyte material exhibiting high ion conductivity even at low temperature, and in the development of a thin-film electrolyte SOFC using a thin solid electrolyte layer and reducing overvoltage of the solid electrolyte layer, even at low temperature.

In the development of such solid electrolyte materials exhibiting high ion conductivity at low temperature, for example, a solid electrolyte material using a perovskite oxide such as $LaSrGaMgO_3$ and the like has been developed, and a material exhibiting equivalent ion conductivity at 600° C. to that of the above-described YSZ operated at 1,000° C. has been proposed.

Meanwhile, a development of the thin-film electrolyte SOFC has been introduced in D. Ghosh et al.; Electrochemical Society Proceedings, Vol. 99-19. In this literature, a fuel electrode material is used as a base material, and an electrolyte layer having a thickness no thinner than gap hollows on the surface of the fuel electrode material is printed and sintered thereon, and thus the thin-film electrolyte SOFC is prepared, whereby the thinning of the solid electrolyte layer is realized. However, in this structure, it is extremely difficult to form the electrolyte layer so that it is not more than 5 μm because the thickness of the electrolyte layer depends upon the hollows of the sintered body forming the solid electrolyte layer.

Therefore, a new deposition method such as an Electrochemical Vapor Deposition method (EVD method) has been proposed for the surface of a porous material (S. C. Singhal,; Electrochemical Society Proceedings, Vol. 97-18). However, this method is not practical due to the extremely slow deposition rate thereof.

A subject of the thin-film electrolyte SOFC is to form a dense thin-film solid electrolyte layer, which is not permeated with gases, on a porous electrode surface having numerous open gaps. Accordingly, Japanese Patent Application Laid-Open No. H6-88199 (1994) proposes a method of manufacturing a thin-film-coated porous metal material as will be described below. In this method, a predetermined thin film is coated onto a metal support composed of a sintered body that is obtained by dispersing, in a metal matrix, a combustible material such as carbon fiber and crystalline cellulose, and a soluble material such as aluminum and soluble glass fiber or the like. Then, a dispersed phase is removed by heating or chemical treatment, and thus the metal support is made to be porous.

SUMMARY OF THE INVENTION

However, in the method as described above, in which a substrate obtained by sintering a metal matrix and a dispersed phase is used, a thin film is formed on the surface thereof, and then the dispersed phase is removed, there are problems as described below in the vicinity of the surface on which the thin film has been formed when the dispersed phase is removed from the matrix phase. One of the problems is that the dispersed phase remains impounded within the matrix. Another problem is that the dispersed phase destroys the film and moves outside the matrix phase. In the case of the fuel cell, when any crack or delamination occurs in the electrolyte film serving as the partition wall for gases, the fuel gas and air mix with each other without contributing to the generation of electric power. This leads to problems such as the lowering of generated electric power output, the occurrence of local abnormal heating at cracked portions, and eventually, breakage of the entire cell body.

In addition, the entire body of the metal support is made to be porous as described above, and therefore, the porous surface is exposed on a portion on which the electrolyte is not deposited, and a gas sealing cannot be executed across both support surfaces. Accordingly, in order to prevent the leakage of gases following the embodiments described in the foregoing publication, the electrolyte layer must be formed on the entire surface of the metal support. However, as the area of the electrolyte layer becomes wider, delamination and cracks thereof are more prone to occur since stress against the electrolyte layer becomes larger and heat stress caused by a difference between the thermal expansion coefficients and the like of both the electrolyte material and the metal support also becomes larger. The delamination and cracks of the electrolyte layer caused on the surface of the porous metal support immediately lead to the leakage of gases, which will then be a critical issue to the fuel cell.

When the cells formed by use of the supporting substrate made to be entirely porous are laminated to make a stack, flange portions are joined so as to cover the side surfaces of the porous substrate and a part of the surface on which the electrolyte layer is not formed, so as to be able to execute the gas sealing. Thus, a cell plate is formed. In this case, it is necessary to join the flange portion and the porous substrate together and the flange portion and an electric power generation layer portion together while securing the gas sealing properties thereof.

In such a complicated structure including many different types of materials in the joint portions, in the case where the temperature of the stack is increased and decreased frequently, as in a vehicle-mounted stack, cracks and delamination at the joint portions occur due to the difference in thermal expansion coefficient. Thus, the gas sealing property is lowered, causing a problem of degradation in durability.

The present invention was made focusing on the above-described problems in regard to the deposition technology for the solid electrolyte layer provided on the porous metal surface. An object of the present invention is to provide a cell body for a fuel cell, which is capable of constituting a cell element including a dense solid electrolyte thin film and a gas flow path at required positions on the metal support, and capable of obtaining a solid oxide fuel cell excellent in output density per volume at low cost, and to provide a method of manufacturing such a cell body for a fuel cell, and provide a solid oxide fuel cell stack using such a cell body.

The first aspect of the present invention provides a cell body for a fuel cell, comprising: a metal support; and an electrolyte layer and an air electrode layer, the electrolyte layer and the air electrode layer being formed on the metal support, wherein a concave portion is formed in an arbitrary pattern on the metal support, and a bottom of the concave portion is made to be porous.

The second aspect of the present invention provides a method of manufacturing a cell body for a fuel cell, comprising: forming an electrolyte layer and an air electrode layer at an arbitrary region on a metal support sequentially; and making the region of the metal support porous, the region having the electrolyte layer and the air electrode layer formed thereon.

The third aspect of the present invention provides a method of manufacturing a cell body for a fuel cell, comprising: forming a fuel electrode layer, an electrolyte layer and an air electrode layer at an arbitrary region on a metal support in a sequential order of the fuel electrode layer, the electrolyte layer and the air electrode layer or in a reverse order thereof; and making the region of the metal support porous, the region having the fuel electrode layer, the electrolyte layer and the air electrode layer formed thereon.

The fourth aspect of the present invention provides a fuel cell stack, comprising: a cell body for a fuel cell including a metal support and an electrolyte layer and an air electrode layer, the electrolyte layer and the air electrode layer being formed on the metal support, wherein a concave portion is formed in an arbitrary pattern on the metal support, a bottom of the concave portion is made to be porous, and the fuel cell stack is constituted by stacking the cell bodies.

The fifth aspect of the present invention provides a solid oxide fuel cell, comprising: a cell body for a fuel cell including a metal support and an electrolyte layer and an air electrode layer, the electrolyte layer and the air electrode layer being formed on the metal support, wherein a concave portion is formed in an arbitrary pattern on the metal support, and a bottom of the concave portion is made to be porous.

The sixth aspect of the present invention provides a solid oxide fuel cell, comprising: a fuel cell stack comprising a cell body for a fuel cell including a metal support and an electrolyte layer and an air electrode layer, the electrolyte layer and the air electrode layer being formed on the metal support, wherein a concave portion is formed in an arbitrary pattern on the metal support, a bottom of the concave portion is made to be porous, and the fuel cell stack is constituted by stacking the cell bodies.

BRIEF DESCRIPTION OF THE DRAWINGS

The invention will now be described with reference to the accompany drawings wherein.

DETAILED DESCRIPTION OF THE PREFERRED EMBODIMENT

Hereinafter, description will be made of embodiments of the present invention with reference to the drawings.

A cell body for a fuel cell according to the present invention is characterized in that a cell having at least an electrolyte layer and an air electrode layer formed on a metal support is constituted in such a manner that a concave portion is formed in an arbitrary pattern on the metal support, and the bottom of the concave portion is made to be porous. Therefore, the cell body is applicable to other cell members constituted to form functional thin films on the metal supports. For example, the cell body can be adapted to a hydrogen separation cell in which a thin film of a palladium alloy or the like is formed, the thin film having a hydrogen separation function, and to a gas separation cell in which a thin film having a $CO_2$ separation function, such as a ceramic film including silica, zeolite and the like, has fine pores in nanometer order in the diameters thereof.

Figure 7:
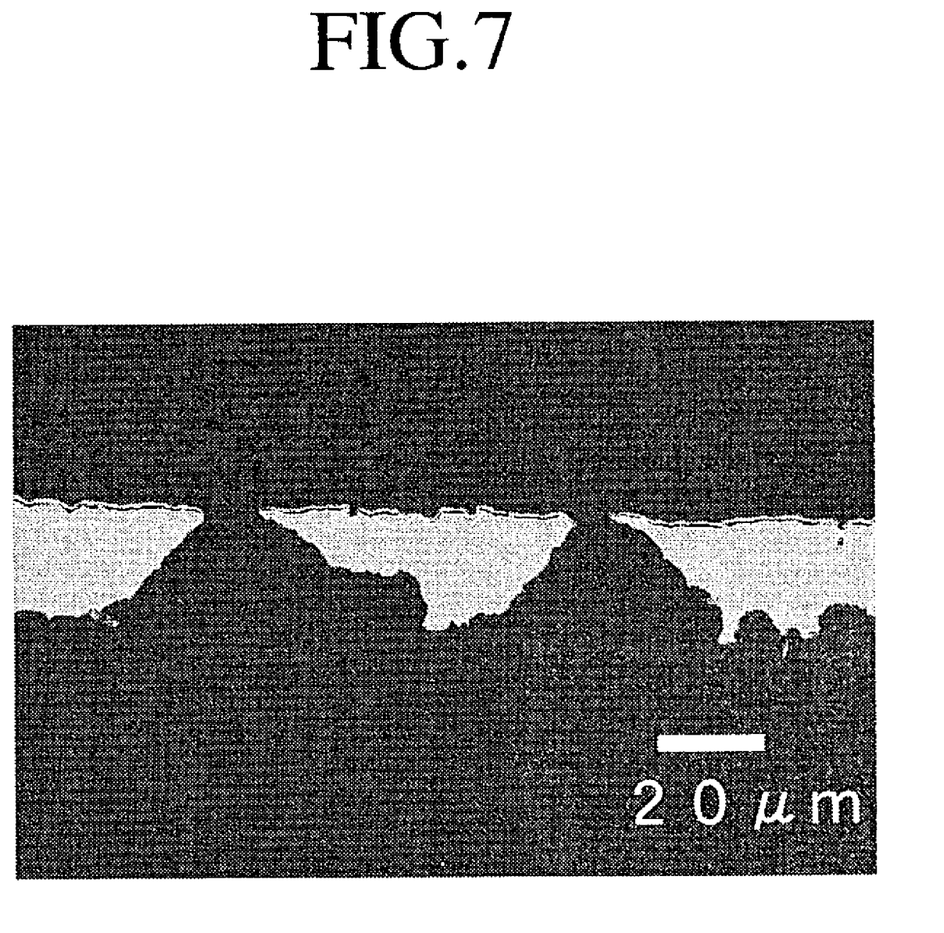
FIG. 7 is a SEM view showing a cross-section of a metal support, which is made to be porous by chemical etching.

For example, metal foil such as nickel functions sufficiently as a substrate for vacuum deposition and thermal spraying even if the foil has a thickness of not more than 20 μm, and the foil can also be used as the metal support. Meanwhile, chemical etching treatment for an arbitrary portion of the foil forms numerous fine pores as shown in FIG. 7 in the foil, thus making it possible to impart gas permeability thereto. Accordingly, an electrolyte or an electrode layer is deposited on the metal foil as described above, and used as a substrate (a support), then the deposited position is made to be porous by etching, thus making it possible to constitute a thin and lightweight cell body. Thus, the miniaturization and weight reduction of the fuel cell stack and the solid oxide fuel cell, which use the above-described cell bodies, can be achieved. In this instance, the metal support described above can be allowed to function not only as the support for the cell structure described above, but also as the fuel electrode or a combination of the fuel electrode and a collector depending upon the selection of materials.

Here, as to the chemical etching treatment used in the present invention, one which is capable of forming a plurality of fine pores in an etched area is preferably adopted. For example, a surface-roughening agent (for example, Mec Nickel Roughener 1870 (product name) made by Mec Co., Ltd.) is useable. This agent is an agent used for roughening the surface of wires in order to improve adhesive force between wires and resins in the manufacturing process of a printed-wiring board.

Moreover, the metal foil for use in the present invention is not as uneven as the sintered body or the porous metal, and is not made to be porous during the deposition process. Therefore, it is possible to form a dense film having a thickness in micrometer order, for example, approximately 5 μm, with which it is extremely difficult to deposit a film on the porous metal. Accordingly, it becomes easy to form a cell structure including the dense electrolyte layer on the metal foil. thus, it also becomes possible to fabricate a cell in which both of the electrodes and the electrolyte have a thickness of not more than several tens of micrometers.

The thinning of the respective layers lowers resistance values in the thickness direction thereof and improves the generated power output performance. Besides the above, this thinning leads to the reduction of thermal strain caused by the difference in thermal expansion coefficient between the materials constituting the respective layers, and ultimately to the prevention of delamination and cracks caused by thermal stress.

Meanwhile, in the case of making the metal foil porous as the support, only the area constituting the cell body is made to be porous by performing etching via use of a mask, thus making it possible to impart the gas permeability to the support. Thus, the area that does not constitute the cell body is not made to be porous simultaneously, and therefore, it is not necessary to form a gas barrier layer for preventing gas permeation in a portion where no cell element exists. Hence, electrolyte layers, each having a small area, can be disposed in a dispersed manner on the support. Because the electrolyte layer can be sub-divided, each having a small area, the inherent stress of the film of the electrolyte layer can be reduced, and delamination thereof from the support and cracks therein seldom occur. In addition, even if the electrolyte layer film is formed on the entire surface of the support, delamination and cracks, which occur outside the etched area, do not immediately lead to the leak, and a cell structure excellent in durability is obtained.

As a material of the metal support described above, metal or an alloy including at least one of iron, nickel and copper, that is, besides nickel and copper, a Ni—Cu alloy, a Ni-based alloy or the like is usable. In concrete terms, stainless steel, Inconel (a registered trademark of INCO Company), Hasteloy (a registered trademark of Haynes International Corporation), Kovar (54 wt % for Fe, 29 wt % for Ni, 17 wt % for Co) and Invar (64 wt % for Fe, 36 wt % for Ni) are usable. With regard to the thickness of the metal support, the foil-shaped metal as described above, which has a thickness ranging from 10 μm to 500 μm, is desirably used. Specifically, when the metal support is less than 10 μm, the handling thereof, regarding the deposition substrate, gets difficult. On the other hand, when the thickness exceeds 500 μm, it takes longer to make the fine pores of the metal support by etching, and in addition, the effect of miniaturization and weight reduction tends not to be thoroughly obtained. Moreover, the case described above is undesirable because of a lower manufacturing yield due to the deterioration of the coated film and the occurrence of cracks during the etching process. The thickness of the metal support (the substrate) is set in a range from 10 μm to 500 μm to form the metal support in a foil shape, and thus the support is reduced in weight and miniaturized to enable output density per volume thereof to be enhanced. In addition, heat capacity thereof is reduced, facilitating the heating of the cell plate (or the stack) to the operation temperature. As described above, excellent effects are obtained. Furthermore, another excellent effect is brought, that the manufacturing cost can be reduced because the cost of the metal support is low.

In the cell body for the fuel cell according to the present invention, it is possible for the plate-shaped metal support to be used as the cell plate. In addition, it is also possible to obtain a tube-shaped cell by use of a cylindrical metal support. In other words, because the support used in the present invention is made only of metal, the support can be easily formed into a micro-tube of which the outer diameter is several millimeters or less. Furthermore, after the electrolyte layer and the electrode layer are deposited on the outer circumference of the metal tube, etching is performed from the inner circumference thereof, thus the metal tube can be made to be porous. Thus, it is possible to obtain an extremely thin tube cell, for example, like an injection needle. The tube-type cell as described above can be made up to the fuel cell stack by bundling a plurality thereof. Thus, a small and lightweight fuel cell can be provided.

As to the solid electrolyte, materials conventionally known in public, for example, material that contains, as a main component, stabilized zirconia containing neodymium oxide ($Nd_2O_3$), samarium oxide ($Sm_2O_3$), yttrium oxide ($Y_2O_3$), gadolinium oxide ($Gd_2O_3$), scandium oxide ($Sc_2O_3$) or the like, and materials containing $CeO_2$, $Bi_2O_3$, $LaGaO_3$ and the like, can be used as main components. However, the materials to be used are not limited to those listed above.

As to the fuel electrode material, for example, publicly known nickel, nickel cermet, platinum and the like are available. As to the air electrode material, for example, perovskite-type oxide such as $La_{1-x}Sr_xMnO_3$, $La_{1-x}Sr_xCoO_3$, silver and the like are available. However, the materials to be used are not limited to those listed above. Note that, as described above, nickel, a nickel-based alloy, a Ni—Cu alloy and the like are used as the metal support, thus also making it possible to use the support as the fuel electrode.

Note that, in the case where a cell element composed of the fuel electrode layer, the electrolyte layer and the air electrode layer is formed on the metal support without having the metal support also serve as the fuel electrode, it is general to laminate the above-described layers in this order. However, a reverse order thereto is also applicable. Specifically, it is also possible to laminate the air electrode layer, the electrolyte layer and the fuel electrode layer in this order on the support. However, in this case, the use of a material excellent in oxidation resistance, for example, such as Inconel and heat resistant stainless steel (Fe-20Cr-5Al and others) as the metal support, is recommended.

The present invention will be described below in detail based on examples.

EXAMPLE 1

As a substrate (a metal support), a metal support added to a frame was used, which was obtained by joining a frame made of Inconel 601, of which size was 50 mm×50 mm (outer dimension), 40 mm×40 mm (inner dimension) and 0.5 mm (thickness), onto one surface of foil made of Inconel 601, of which size was 50 mm×50 mm×0.03 mm. Note that the composition of Inconel 601 is 61 wt % for Ni, 23 wt % for Cr, 14 wt % for Fe, 1 wt % for Al and the like. On a region of 30 mm×30 mm located at the center position of the surface, on which the frame of the support was not formed, 3 mol % yttria-stabilized zirconia (hereinafter, referred to as "3YSZ"), of which thickness was 2 μm, was deposited by a RF sputtering method at a heat of 700° C., and thus an electrolyte layer was provided. Following this, on a region of 27 mm×27 mm on the 3YSZ layer, $(Sm_{0.5}, Sr_{0.5})CoO_{3-d}$ (hereinafter, referred to as "55SSC") was deposited at a thickness of 1 μm, and thus an air electrode layer was provided.

Figure 1A:
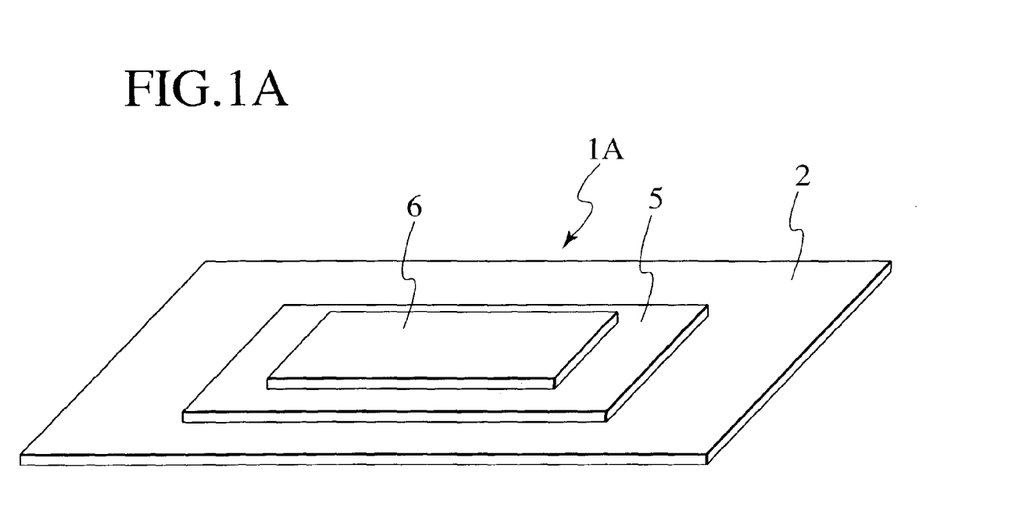
FIG. 1A is a perspective view showing a shape of the cell plate for the fuel cell of embodiment 1 and 3 according to the present invention.
Figure 1B:
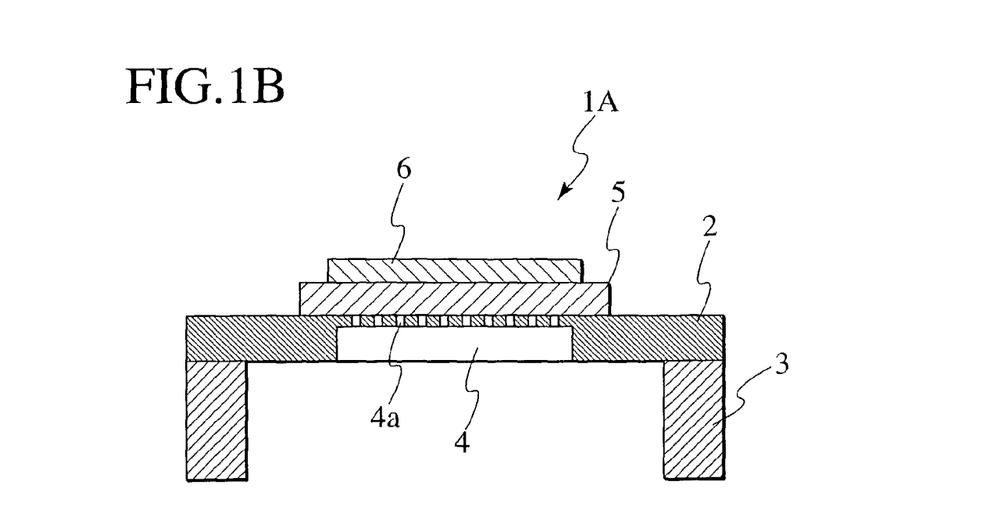
FIG. 1B is a cross-sectional view showing a shape of the cell plate for the fuel cell of embodiment 1 and 3 according to the present invention.

Next, a dry film was pasted onto the entire surface of the metal support. Then, the dry film, only on the region of 25 mm×25 mm located at the center position of the surface on which the frame was formed was removed. Thus, the Inconel foil was exposed. An etching solution (Mec Ni Roughener (product name) made by Mec Co., Ltd.) was sprayed onto the exposed portion for 300 seconds, and thus the Inconel foil was made to be porous. Then, the dry film was peeled apart by use of an alkaline-based cleaning solution. Thus, the cell plate 1A for the fuel cell as shown in FIGS. 1A and 1B was provided. Note that, in FIGS. 1A and 1B, the reference numeral 2 denotes the Inconel foil as the metal support; the reference numeral 3 denotes the frame made of Inconel; the reference numeral 4 denotes the concave portion formed in the size of 25 mm×25 mm by etching; the reference numeral 4a denotes the porous portion formed on the bottom of the concave portion 4 by etching; the reference numeral 5 denotes the electrolyte layer; and the reference numeral 6 denotes the air electrode layer. Moreover, it was confirmed that a plurality of fine pores were formed in the porous portion 4a on the bottom of the concave portion 4. The total opening area of the fine pores was 185 mm², which was approximately 30% of the area of the concave portion 4.

By use of the cell plate 1A for the fuel cell thus obtained, a power generation test by $H_2$—$O_2$ was conducted with the Inconel foil as the fuel electrode. As a result, an output characteristic of 100 mW/cm² was obtained at 600° C.

EXAMPLE 2

As a substrate (a metal support), a metal support added to a frame was used, which was obtained by joining a frame made of a heat resistant stainless steel material (Fe-20% Cr-5% Al), of which size was 50 mm×50 mm (outer dimension), 40 mm×40 mm (inner dimension) and 0.5 mm (thickness), onto one surface of foil made of Inconel 601, of which size was 50 mm×50 mm×0.03 mm. On a region of 25 mm×25 mm located at the center position of the surface, on which the frame of the support was not formed, a NiO-8YSZ cermet layer which was 1 μm thick (a mixed composite of NiO and 8 mol % yttria-stabilized zirconia in a mass ratio of 75:25) was deposited by the RF sputtering method at a heat of 700° C. Thus, a fuel electrode layer was provided. Subsequently, on a region of 30 mm×30 mm at the center position of the above-described layer, 8YSZ which was 2 μm thick was deposited by the RF sputtering method at a heat of 700° C., and thus an electrolyte layer was provided. In addition, on a region of 25 mm×25 mm on the 8YSZ layer, 55SSC was deposited at a thickness of 1 μm, and thus an air electrode was provided.

Figure 2A:
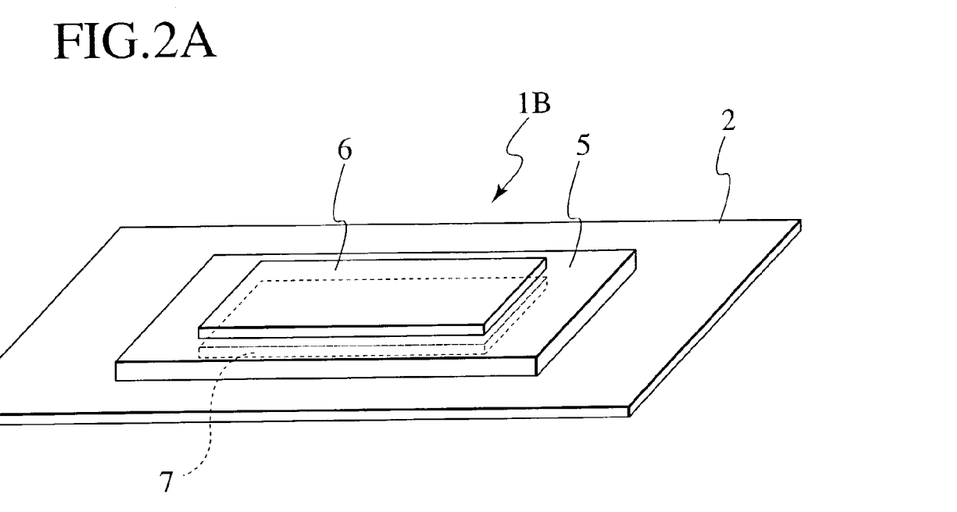
FIG. 2A is a perspective view showing a shape of the cell plate for the fuel cell of embodiment 2 according to the present invention.
Figure 2B:
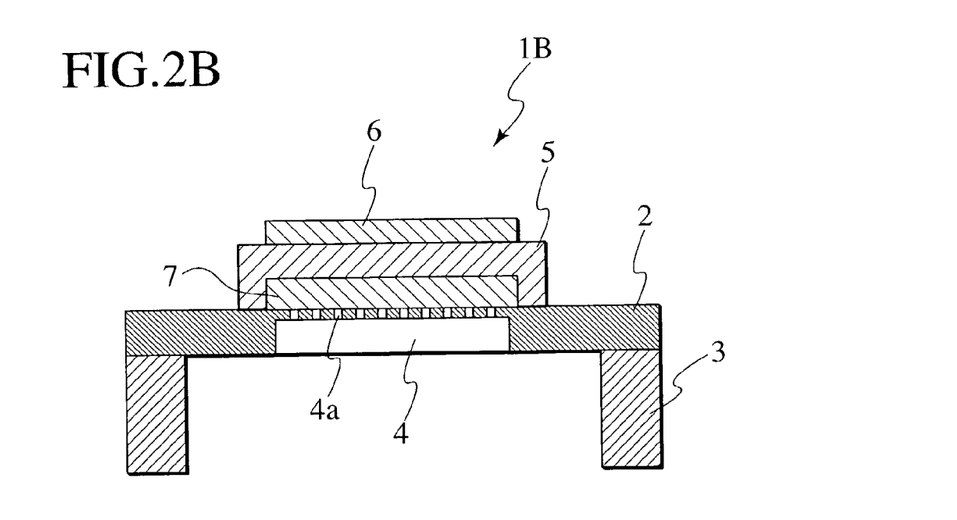
FIG. 2B is a cross-sectional view showing a shape of the cell plate for the fuel cell of embodiment 2 according to the present invention.

Next, a dry film was pasted onto the entire surface of the metal support. Then, the dry film only on the region of 23 mm×23 mm located at the center position of the surface on which the frame was formed was removed. Thus, the Inconel foil was exposed and an etching solution similar to that in Example 1 was sprayed thereonto for 300 seconds, and thus the Inconel foil was made to be porous. Then, the dry film was peeled apart by use of an alkaline-based cleaning solution. Thus, the cell plate 1B for the fuel cell as shown in FIGS. 2A and 2B was obtained. Note that, in FIGS. 2A and 2B, the reference numeral 2 denotes the Inconel foil as the metal support; the reference numeral 3 denotes the frame made of Inconel; the reference numeral 4 denotes the concave portion formed in the size of 23 mm×23 mm by etching; the reference numeral 4a denotes the porous portion formed on the bottom of the concave portion 4 by etching; the reference numeral 5 denotes the electrolyte layer; the reference numeral 6 denotes the air electrode layer; and the reference numeral 7 denotes the fuel electrode layer. Moreover, the total opening area of fine pores formed in the porous portion 4a occupied approximately 30% of the area of the concave portion 4 similarly to the above-described example.

By use of the cell plate 1B for the fuel cell thus obtained, a power generation test by $H_2$—$O_2$ was conducted with NiO-8YSZ cermet on the Inconel foil being taken as the fuel electrode. As a result, an output characteristic of 100 mW/cm² was obtained at 600° C.

EXAMPLE 3

As a substrate (a metal support), a foil made of a Ni—Cu alloy (42-48 wt % for Ni), of which size was 50 mm×50 mm×0.1 mm, was used. In advance of deposition of an electrolyte layer and the like, the deposition surface of this foil was plated with Cu. Then, this alloy foil was sandwiched between two metal masks. These two metal masks were made of stainless steel and had through-holes of 30 mm×30 mm square and 26 mm×26 mm square, respectively. Moreover, this sandwiching was made so as to expose the plated surface of the metal foil through the through-hole of 30 mm×30 mm. Samarium-oxide added ceria $(Ce_{0.8}, Sm_{0.2})O_{2-d}$ (hereinafter, referred to as "2SDC") was deposited at a thickness of 2 μm thick on the above-described through-hole surface of 30 mm×30 mm square by use of a GD method (a gas deposition method), and thus an electrolyte layer was provided. Subsequently, on the surface of the above-described electrolyte layer, 5SSC was deposited at a thickness of 1 μm in the size of 25 mm×25 mm by use of a mask, and thus an air electrode was provided.

Next, the deposited alloy foil was immersed in the etching solution described above for 10 minutes together with the metal mask, and the portions coated with the electrolyte layer and the air electrode layer on the foil were made to be porous. After the above-described process, the foil was taken from the etching solution, and then was washed and dried. Thus, the cell plate 1C for the fuel cell having a similar shape to that shown in FIGS. 1A and 1B (excluding the Inconel frame 3) was obtained. Note that the total opening area of the fine pores formed in the porous portion 4a occupied approximately 35% of the area of the concave portion 4.

Moreover, the cell plate IC for the fuel cell thus obtained was brazed to be fixed onto an alumina-made frame, of which size was 50 mm×50 mm. As a result of a power generation test by $H_2$—$O_2$ using the metal support (Cu—Ni alloy foil) as the fuel electrode, an output performance of 100 mW/cm$^2$ was obtained at 600° C.

EXAMPLE 4

As a substrate (a metal support), a pipe made of Hasteloy C-276, of which size was 2.0 mm (outer diameter), 0.05 mm (thickness) and 50 mm (length), was used. Note that the composition of Hasteloy C-276 is 57 wt % for Ni, 16 wt % for Cr, 16 wt % for Mo, 6 wt % for Fe and the like. Yttria-stabilized zirconia (8YSZ) was deposited on the surface of the pipe at a thickness of 2 μm in the region of 30 mm wide by use of a GD method. The above-described process was executed in a state where the pipe was masked within the regions of 10 mm from both of the ends thereof on both of the outer and inner surfaces thereof. Thus, an electrolyte layer was provided. Subsequently, 55SSC was deposited to form a 1 μm thick film in the region of 25 mm wide on the electrolyte surface by using a mask. Thus, an air electrode was provided.

Figure 3A:
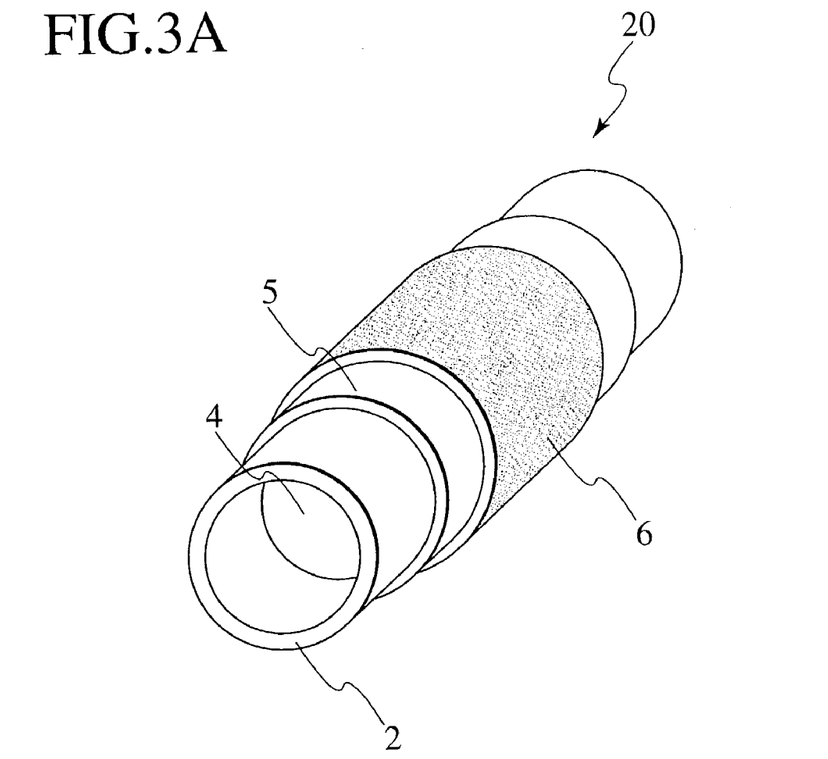
FIG. 3A is a perspective view showing a shape of the cell body for the tube type fuel cell of embodiment 4 according to the present invention.
Figure 3B:
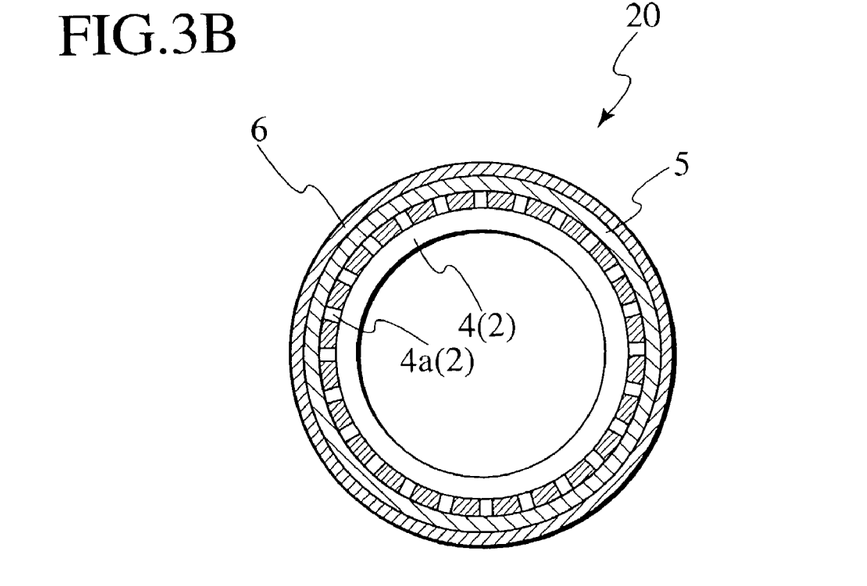
FIG. 3B is a cross-sectional view showing a shape of the cell body for the tube type fuel cell of embodiment 4 according to the present invention.

Next, the deposited pipe was immersed in the similar etching solution to that described above for 10 minutes to be etched. Thus, a concave portion was formed on the inner surface of the portion coated with the electrolyte and the air electrodes on the pipe, and at the same time, the bottom of the concave portion was made to be porous. Subsequently, the resultant was taken from the etching solution, and then was washed and dried. Thus, the cell 20 for the tube-type fuel cell as shown in FIGS. 3A and 3B was obtained. Note that, in FIGS. 3A and 3B, the reference numeral 2 denotes the Hasteloy pipe as the metal support; the reference numeral 4 denotes the concave portion formed by etching; the reference numeral 4a denotes the porous portion formed on the bottom of the concave portion 4; the reference numeral 5 denotes the electrolyte layer; and the reference numeral 6 denotes the air electrode layer. Moreover, the total opening area of the fine pores formed in the porous portion 4a on the bottom of the concave portion 4 occupied approximately 30% of the area of the concave portion 4.

Moreover, the cell 20 for the tube-type fuel cell thus obtained was brazed to be fixed onto an alumina-made frame, of which size was 50 mm×50 mm. As a result of a power generation test by $H_2$—$O_2$ using the metal support (the Hasteloy pipe) as the fuel electrode, an output performance of 100 mW/cm$^2$ was obtained at 600° C.

EXAMPLE 5

As a substrate (a metal support), 42-alloy foil (Fe-42 wt % for Ni), of which size was ϕ50 mm×0.15 mm, was used. In the region within ϕ30 mm around the center position of the metal support, a 2 μm thick NiO-55SDC cermet layer (a composite made of NiO and 50 mol % samaria-substituted ceria in a mass ratio of 70:30) was deposited by use of a RF sputtering method at a heat of 700° C. Thus, a fuel electrode layer was provided. Subsequently, in the region of ϕ35 mm around the center position of the substrate, 4 μm thick 3YSZ was deposited by use of the RF sputtering method at a heat of 700° C. Thus, an electrolyte layer was provided. In addition, 1 μm thick 55SSC was deposited in the region of ϕ20 mm on the 3YSZ layer, and thus an air electrode was provided.

Figure 4A:
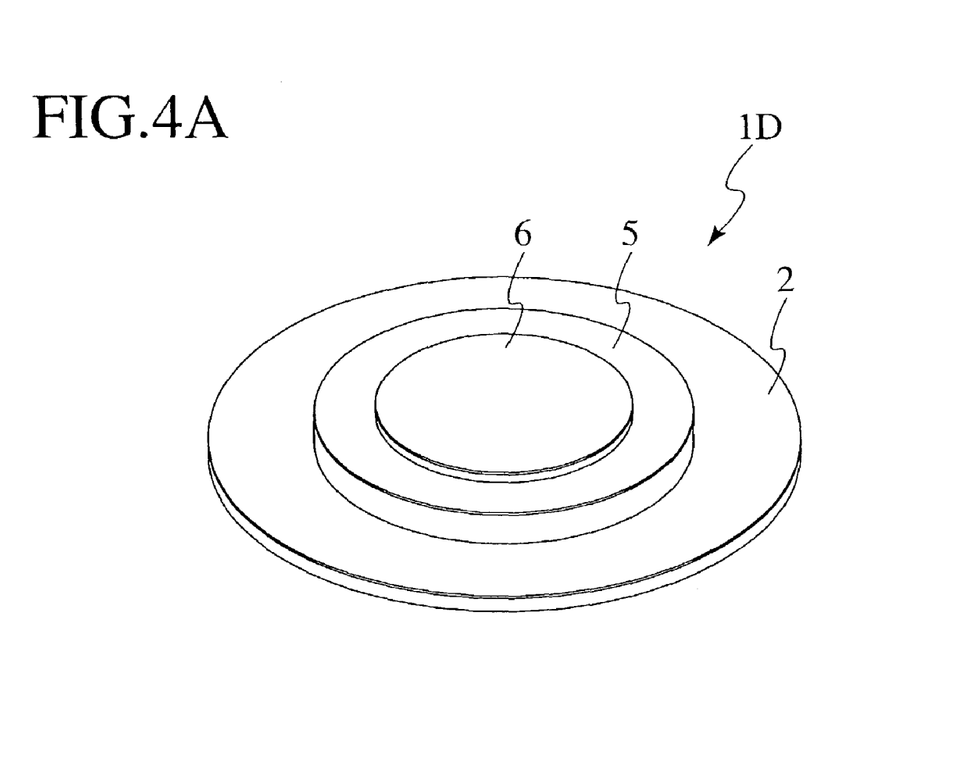
FIG. 4A is a perspective view showing a shape of the cell plate for the fuel cell of embodiment 5 according to the present invention.
Figure 4B:
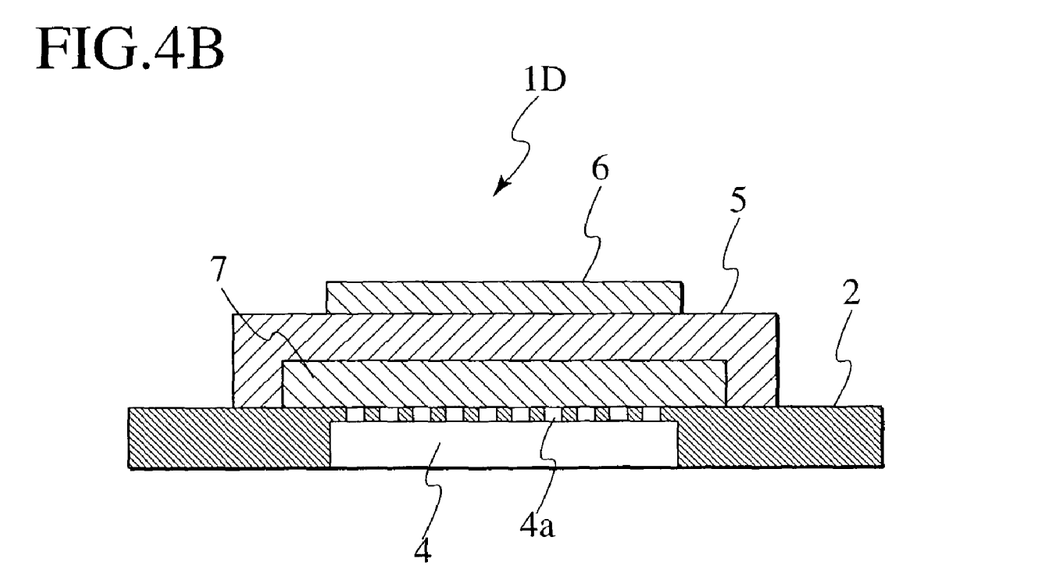
FIG. 4B is a cross-sectional view showing a shape of the cell plate for the fuel cell of embodiment 5 according to the present invention.

Next, a dry film was pasted onto the entire surface of the metal support. The dry film only in the region of ϕ20 mm around the center position of the surface, on which the electrolyte layer and the like were not formed, was removed. Thus, the 42-alloy foil was exposed and an etching solution similar to that in Example 1 was sprayed thereonto for 300 seconds, and thus the 42-alloy foil was made to be porous. Then, the dry film was peeled apart by use of an alkaline-based cleaning solution. Thus, the cell plate 1D for the fuel cell was obtained. Note that, in FIGS. 4A and 4B, the reference numeral 2 denotes the 42-alloy as the metal support; the reference numeral 4 denotes the concave portion formed in a size of ϕ20 mm by etching; the reference numeral 4a denotes the porous portion formed on the bottom of the concave portion 4 by etching; the reference numeral 5 denotes the electrolyte layer; the reference numeral 6 denotes the air electrode layer; and the reference numeral 7 denotes the fuel electrode layer. Moreover, the total opening area of the fine pores formed in the porous portion 4a occupied approximately 30% of the area of the concave portion 4 similarly to the above-described examples.

By use of the cell plate 1D for the fuel cell thus obtained, a power generation test by $H_2$—$O_2$ was conducted with NiO-8YSZ cermet on the Inconel foil being taken as the fuel electrode. As a result, the output characteristic of 100 mW/cm$^2$ was obtained at 600° C.

EXAMPLE 6

Figure 5A:
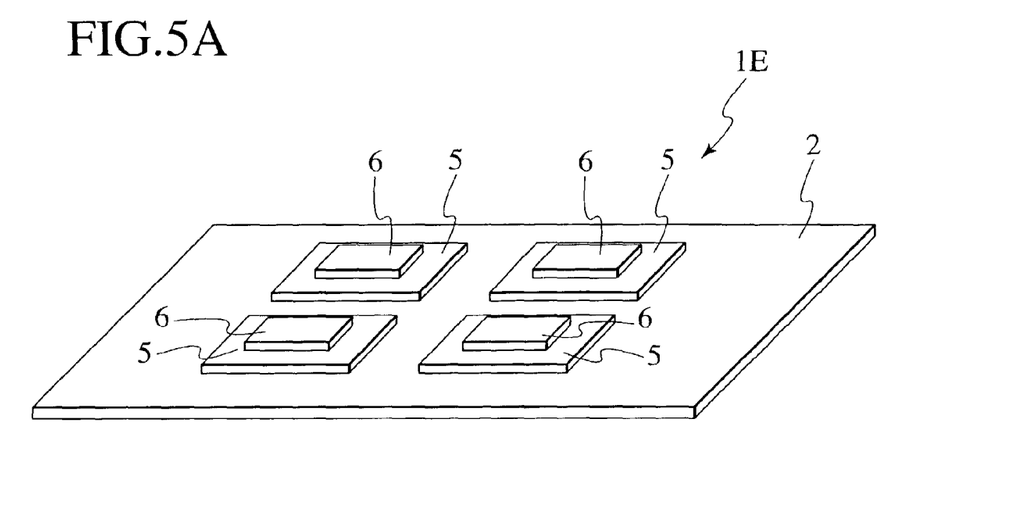
FIG. 5A is a perspective view showing a shape of the cell plate for the fuel cell of embodiment 6 according to the present invention.
Figure 5B:
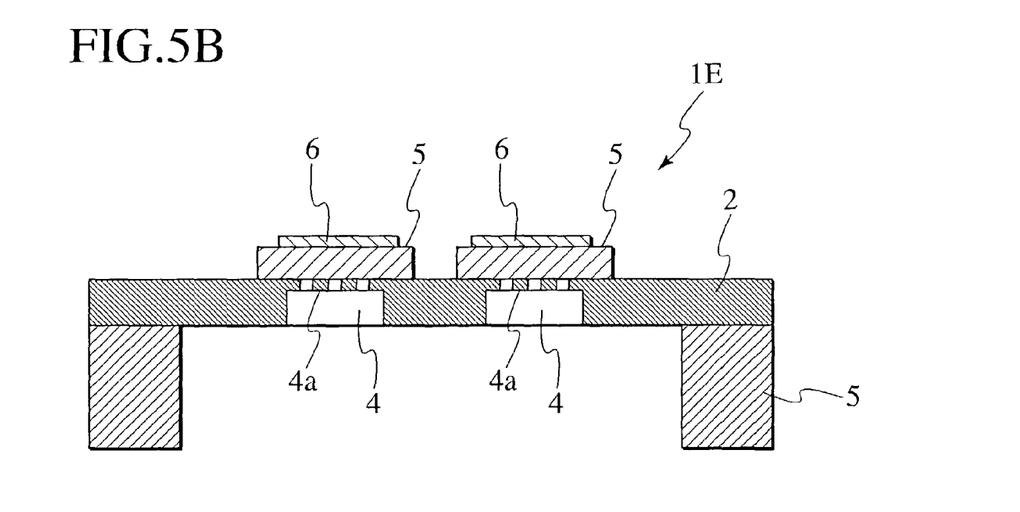
FIG. 5B is a cross-sectional view showing a shape of the cell plate for the fuel cell of embodiment 6 according to the present invention.

As a substrate (a metal support), a metal support added to a frame was used, which was obtained by joining a frame made of Inconel 601, of which size was 50 mm×50 mm (outer dimension), 40 mm×40 mm (inner dimension) and 0.5 mm (thickness), onto one surface of foil made of Inconel 601, of which size was 50 mm×50 mm×0.03 mm. On the surface on which no frame was formed, a 2 μm thick 3YSZ thin film was deposited by use of a RF sputtering method at a heat of 700° C. in four split locations, each size of which was 10 mm×10 mm. Then, 55SSC was deposited at a thickness of 2 μm on the areas of 8 mm×8 mm in size on the respective sputtered areas described above. Subsequently, a dry film was pasted onto the entire surface of the metal support. The dry film only in the regions of 8 mm×8 mm at the center positions, on which the 3YSZ films were formed in the areas of 10 mm×10 mm respectively, was removed. Thus, the Inconel foil was exposed and an etching solution similar to that in Example 1 was sprayed thereonto for 300 seconds, and thus the Inconel foil was made to be porous. Then, the dry film was peeled apart by use of an alkaline-based cleaning solution. Thus, the cell plate 1E for the fuel cell including four single cells was obtained as shown in FIGS. 5A and 5B. On this occasion, the total opening area of the fine pores formed in the porous portion 4a was approximately 30% of the area of the concave portion 4 similarly to above-described examples 1 and 2.

By use of the cell plate 1E for the fuel cell thus obtained, a power generation test by $H_2$—$O_2$ was conducted with the Inconel foil as the fuel electrode. As a result, the output characteristic of 100 mW/cm$^2$ was obtained at 600° C.

EXAMPLE 7

Figure 6:
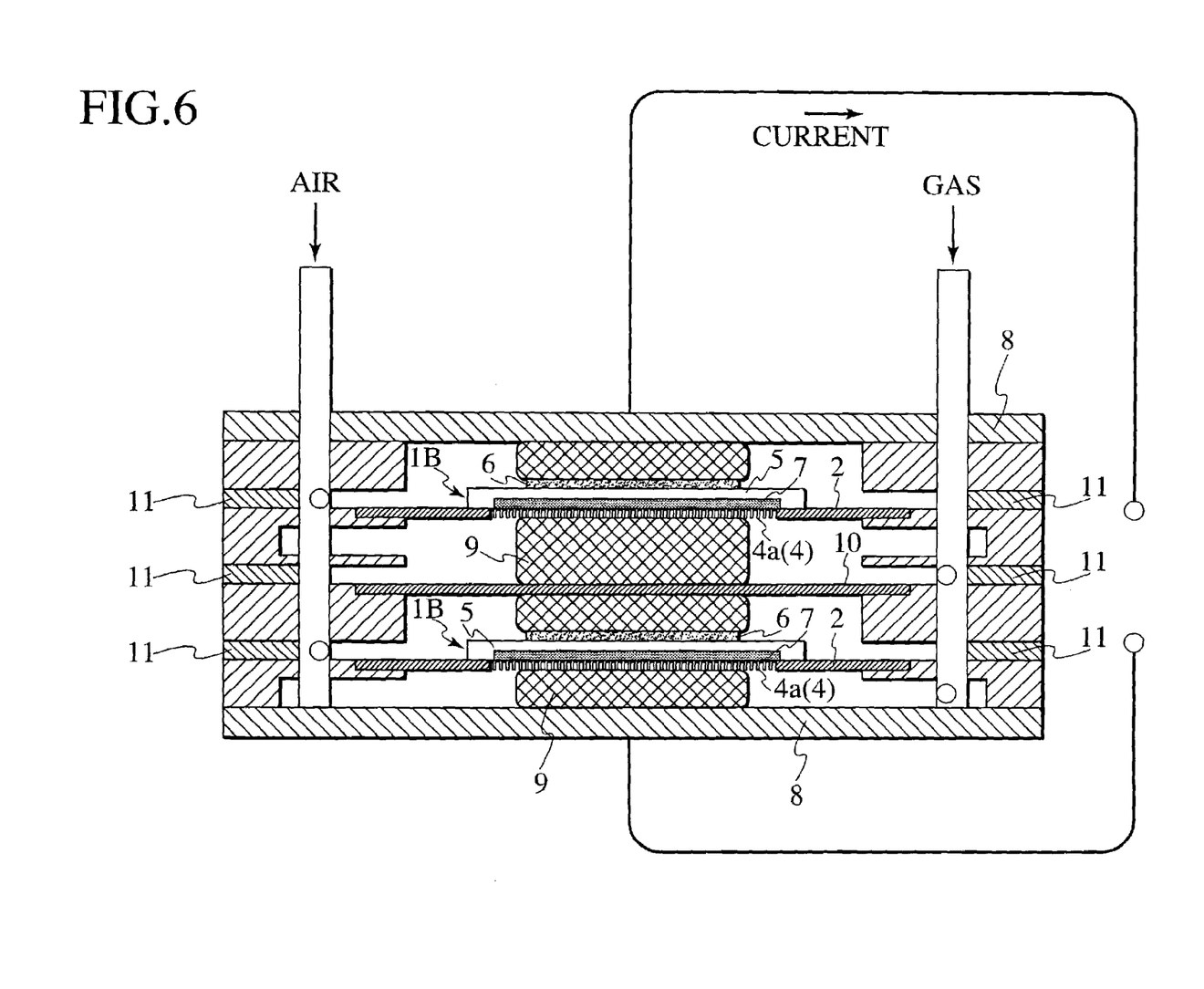
FIG. 6 is a cross-sectional view showing an example of a structure of a fuel cell stack using a fuel cell plate according to the present invention.

FIG. 6 shows an example of a structure of a solid oxide fuel cell using a fuel cell stack constituted by stacking the plurality of cell plates for the fuel cell fabricated similarly to Example 2 described above. In FIG. 6, the reference numeral 2 denotes the metal support; the reference numeral 4a denotes the porous portion of the metal made to be porous by etching; the reference numeral 5 denotes the electrolyte layer; the reference numeral 6 denotes the air electrode layer; and the reference numeral 7 denotes the fuel electrode layer. In addition, the reference numeral 8 denotes the collector plate; the reference numeral 9 denotes the porous collector made of an electro-conductive material; the reference numeral 10 denotes the separator made of an electro-conductive material; and the reference numeral 11 denotes the gas seal.

In the solid oxide fuel cell shown in FIG. 6, air supplied through a pipe is adapted to flow above the respective cell plates 1B in the drawing. HC (hydrocarbon), which is the fuel gas, is adapted to flow below the cell plates 1B in the drawing. Note that, though the solid oxide fuel cell including two cell plates 1B for the fuel cell are illustrated in FIG. 6 for the sake of explanation convenience, it is needless to say that far more cell plates 1B can actually be stacked.

Note that, though the frame exists or does not exist depending on the given Examples, no particular limitations are imposed on the existence of the frame in the present invention. However, the existence of the frame has a merit in that it eliminates the bending or twisting of an extremely thin metal foil when the foil is handled in each process. On the other hand, having no frame also has merit in that it enables impact resistance to be improved because the stress inherent in the cell, or the thermal stress can be released by the ductility and warp of the foil.

The entire content of a Japanese Patent Application No. P2002-129924 with a filing date of May 1, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A cell body for a fuel cell, comprising: a metal support consisting of a single metal layer having a concave portion on a lower surface of the single metal layer and having a plurality of fine pores, the fine pores being provided between an upper surface of the single metal layer and a bottom of the concave portion and penetrating from the upper surface of the single metal layer to the bottom of the concave portion; and
   an electrolyte layer and an electrode layer, either the electrolyte layer or the electrode layer being formed on the fine pores on the upper surface of the metal support.

2. The cell body for a fuel cell of claim 1,
   wherein a sum of opening areas of the fine pores is smaller than an area of the concave portion.

3. The cell body for a fuel cell of claim 1,
   wherein the metal support is metal containing at least one element of iron, nickel and copper.

4. The cell body for a fuel cell of claim 1,
   wherein a thickness of the metal support is within a range from 10 µm to 500 µm.

5. A fuel cell stack, comprising:
   a cell body for a fuel cell according to claim 1, wherein the fuel cell stack is constituted by stacking the cell bodies.

6. A solid oxide fuel cell, comprising:
   a cell body for a fuel cell according to claim 1.

7. A solid oxide fuel cell, comprising:
   a fuel cell stack according to claim 5.

8. The cell body for a fuel cell of claim 1,
   wherein the metal support is used as a fuel electrode, the electrolyte layer is formed on the upper surface of the metal support, and an air electrode layer is formed on the electrolyte layer.

9. The cell body for a fuel cell of claim 1,
   wherein a fuel electrode is formed on the upper surface of the metal support, the electrolyte layer is formed on the fuel electrode, and an air electrode layer is formed on the electrolyte layer.

10. The cell body for a fuel cell of claim 9, wherein the cell body is a circular form.

11. The cell body for a fuel cell of claim 1, wherein the metal support is cylindrical.

12. The cell body for a fuel cell of claim 1,
   wherein the metal support has the plurality of concave portions and is used as a fuel electrode, the plurality of electrolyte layers are formed on the fine pores, and a plurality of air electrode layers are formed on the electrolyte layers.

13. The cell body for a fuel cell of claim 1,
   wherein the fine pores are formed in said single layer by etching.

14. The cell body for a fuel cell of claim 13,
   wherein a portion of the metal support where fine pores are not formed by etching is not gas permeable.

15. The cell body for a fuel cell of claim 1,
   wherein the lower surface of the concave portion has a total opening area of fine pores of 30%.

* * * * *